United States Patent [19]
Paladel

[11] Patent Number: 5,038,265
[45] Date of Patent: Aug. 6, 1991

[54] POWER SUPPLY WITH MULTIPLE OUTPUTS AND LOAD BALANCING

[75] Inventor: Jean-Marie Paladel, Claix, France

[73] Assignee: Bull S.A., Paris, France

[21] Appl. No.: 558,110

[22] Filed: Jul. 26, 1990

[30] Foreign Application Priority Data

Jul. 28, 1989 [FR] France .................................. 89 10204

[51] Int. Cl.[5] ............................................... H02J 3/46
[52] U.S. Cl. ........................................ 363/65; 363/71; 307/24; 307/53; 307/82
[58] Field of Search ..................... 307/18, 24, 53, 82; 363/65, 71

[56] References Cited

U.S. PATENT DOCUMENTS

| 4,074,182 | 2/1978 | Weischedel | 307/82 |
| 4,143,414 | 3/1979 | Brewster et al. | 363/65 |
| 4,809,151 | 2/1989 | Ota | 363/71 |
| 4,814,963 | 3/1989 | Petersen | 363/71 |

FOREIGN PATENT DOCUMENTS

| 0257101 | 2/1988 | European Pat. Off. |
| 659156 | 12/1986 | Fed. Rep. of Germany |

OTHER PUBLICATIONS

Takata, N; Shikagawa, N; Ishii, A., Boost-Converter System with Battery Discharge Currents Equalizer, PESC 1988 Record (Apr.), vol. 2, pp. 1043-1050.

Primary Examiner—Steven L. Stephan
Assistant Examiner—Jeffrey Sterrett
Attorney, Agent, or Firm—Weingarten, Schurgin, Gagnebin & Hayes

[57] ABSTRACT

A power supply with multiple outputs including at least two power converters, each with multiple outputs, a first output of a first power converter being connected in parallel with a first output of a second converter to provide a first load with current. The power supply further includes a first regulating circuit for delivering to each power converter a command signal that is a function of the current delivered to the first load. The power supply also includes at least one other regulating circuit for delivering to an output regulator (postregulator) connected between each power converter and a load other than the first load, a command signal which is a function of the current delivered by each converter output to the load other than the first load.

7 Claims, 3 Drawing Sheets

POWER SUPPLY WITH MULTIPLE OUTPUTS AND LOAD BALANCING

FIELD OF THE INVENTION

This invention relates to power supplies or power converters with multiple outputs, and particularly to power supplies wherein there is equitable load-sharing at each of its outputs.

BACKGROUND OF THE INVENTION

There are power supplies or converters that have a single output that allows the outputs of two or more power converters to be connected in parallel so as to guarantee equitable sharing of the output currents of each power converter. For this purpose, the power supply is controlled by a regulating circuit whose command signal depends on the currents measured at the outputs from each converter to control the power cut-off circuits at the input. However, when similar output voltages from two or more converters with multiple outputs are connected in parallel, it is difficult to guarantee equitable sharing of the output currents among the converters.

SUMMARY OF THE INVENTION

A power supply with multiple outputs includes at least two power converters with multiple outputs, a first output of a first converter being connected in parallel with a similar output of another converter to supply a first load. The power supply further includes a first regulating circuit for delivering to each converter a command signal that is a function of the current delivered to the first load that is connected to the first output of each converter. The power supply also includes at least one other regulating circuit for delivering, to a control input of an output regulator (postregulator) connected between each power converter and load other than the first load, a command signal that is a function of the current delivered by each converter output to the load other than the first load. In an alternate embodiment, the command signal is a function of the input current ($I_{p1}$, $I_{p2}$) of each converter (4, 5).

Each regulating circuit includes a subtractor to subtract the voltage measured across each respective load from a reference voltage to provide an error signal, an amplifier of the error signal to provide an amplified error signal, and a second subtractor to subtract a voltage representing the strength of the current delivered by the converter to the respective load from the amplified error signal.

In a preferred embodiment, the output regulator (postregulator) is linear. This type of linear output regulator (postregulator) is composed of a ballast MOS (or bipolar) transistor which absorbs the excess output voltage from the converter secondary and whose gate (base) is controlled by the command signal.

In an alternate embodiment, the output regulator circuit (postregulator) is an electronic switch connected to the output of the secondary and is controlled by a pulse width modulation circuit whose input receives the output signal from the regulating circuit.

DESCRIPTION OF THE DRAWING

The invention will be more fully understood from the following detailed description, in conjunction with the accompanying figures, in which.

DETAILED DESCRIPTION OF THE INVENTION

Figure 3:
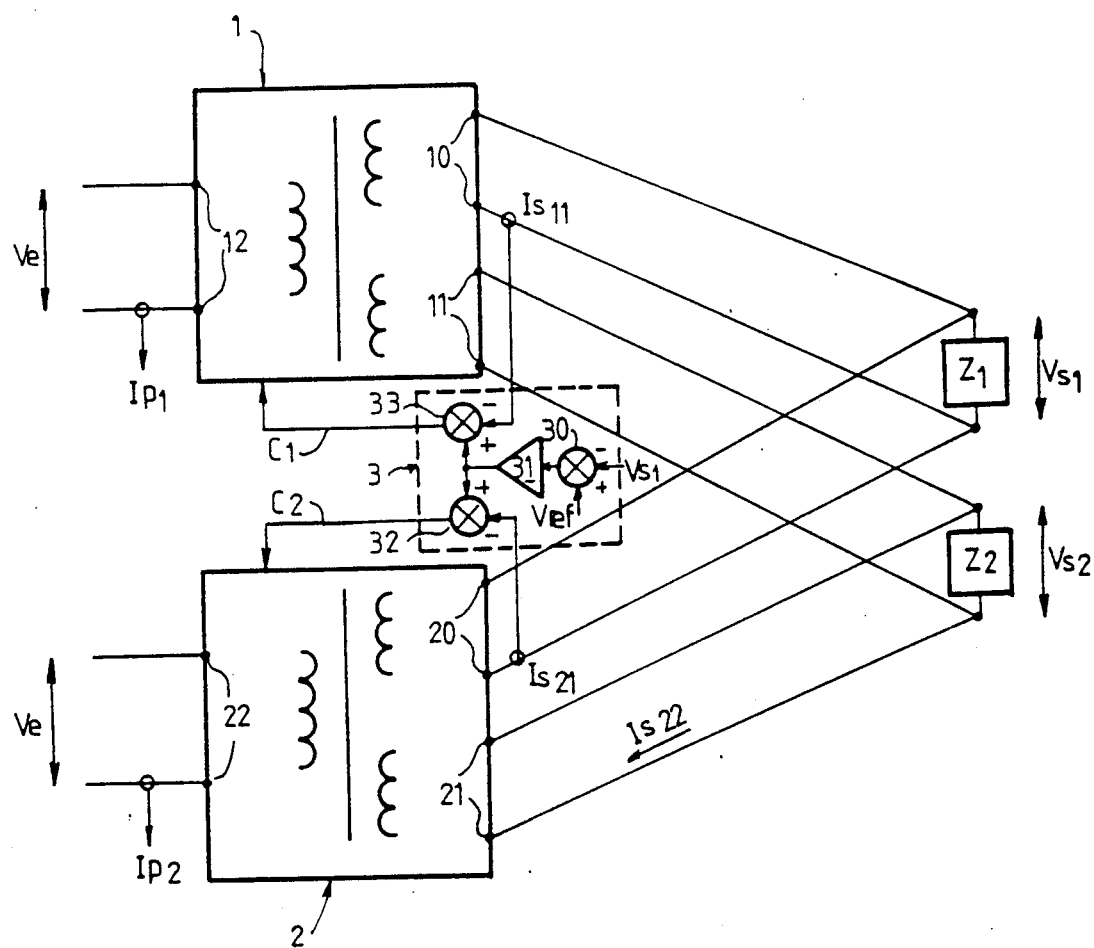
FIG. 3 shows a schematic of a prior art device.

With reference to FIG. 3, a prior art power supply connects in parallel the outputs of two or more power converters (1, 2) with multiple outputs (10, 11, 20, 21) while endeavoring to guarantee equitable sharing of the output currents between the converters. This is the case when the goal is to connect in parallel the similar output voltages corresponding to outputs (10, 20) for the two converters (1, 2) and outputs (11, 21) for these same converters while attempting to guarantee equitable sharing of the current furnished by these outputs as a function of the different loads ($Z_1$) connected in parallel to outputs (10, 20) and ($Z_2$) connected to outputs (11, 21), respectively.

As shown in FIG. 3, it is possible to regulate the output current ($Is_{11}$) supplied by the first output (10) of first converter (1) and the output current ($Is_{21}$) supplied by the first output (20, similar output) of the second converter (2) by control circuit (3). This control circuit supplies the first command signal ($C_1$) that controls the device that cuts off the supply voltage ($V_e$) of the converter (1) available at input terminals (12) of this converter and a second command signal ($C_2$) that also controls the circuit that cuts off the supply voltage ($V_e$) present at input terminals (22) of second converter (2).

This circuit (3) is composed of a first subtraction device (30) receiving at its negative input the voltage signal ($Vs_1$) corresponding to the voltage at the terminals of the first load ($Z_1$) and at its positive input a reference voltage signal ($V_{ref}$).

The output of this first subtractor (30) is sent to an error amplifier circuit (31) which amplies the error signal and whose output is connected to each of the positive inputs of the other two subtraction circuits (32, 33). The negative inputs of these subtraction circuits (32, 33) receive respectively a signal ($Is_{11}$) that represents the current delivered by the first output (10) of the first converter to the load ($Z_1$) and a signal ($Is_{21}$) that represents respectively the current delivered by the first output or similar output of second converter (2) to load ($Z_1$).

The output of the subtraction circuit (33) that receives current ($Is_{11}$) at its negative input is sent to the control circuit that cuts off the input voltage of the first converter. Likewise, the output of the second subtractor (32) is sent to the control circuit that cuts off the input voltage of second converter (2).

With this arrangement, one can guarantee that the currents in load ($Z_1$), supplied respectively by the first output of the first converter and the similar output of the second converter, are in a known ratio. On the other hand, there is no guarantee that the currents supplied by the second output of each of these converters to the second load ($Z_2$) will be balanced. This circuit does not allow equitable sharing of the load between converters. "Equitable load sharing between converters" is understood to be either equality of currents supplied if the converters have the same power or proportionality to their respective abilities if they do not have the same power.

Figure 1:
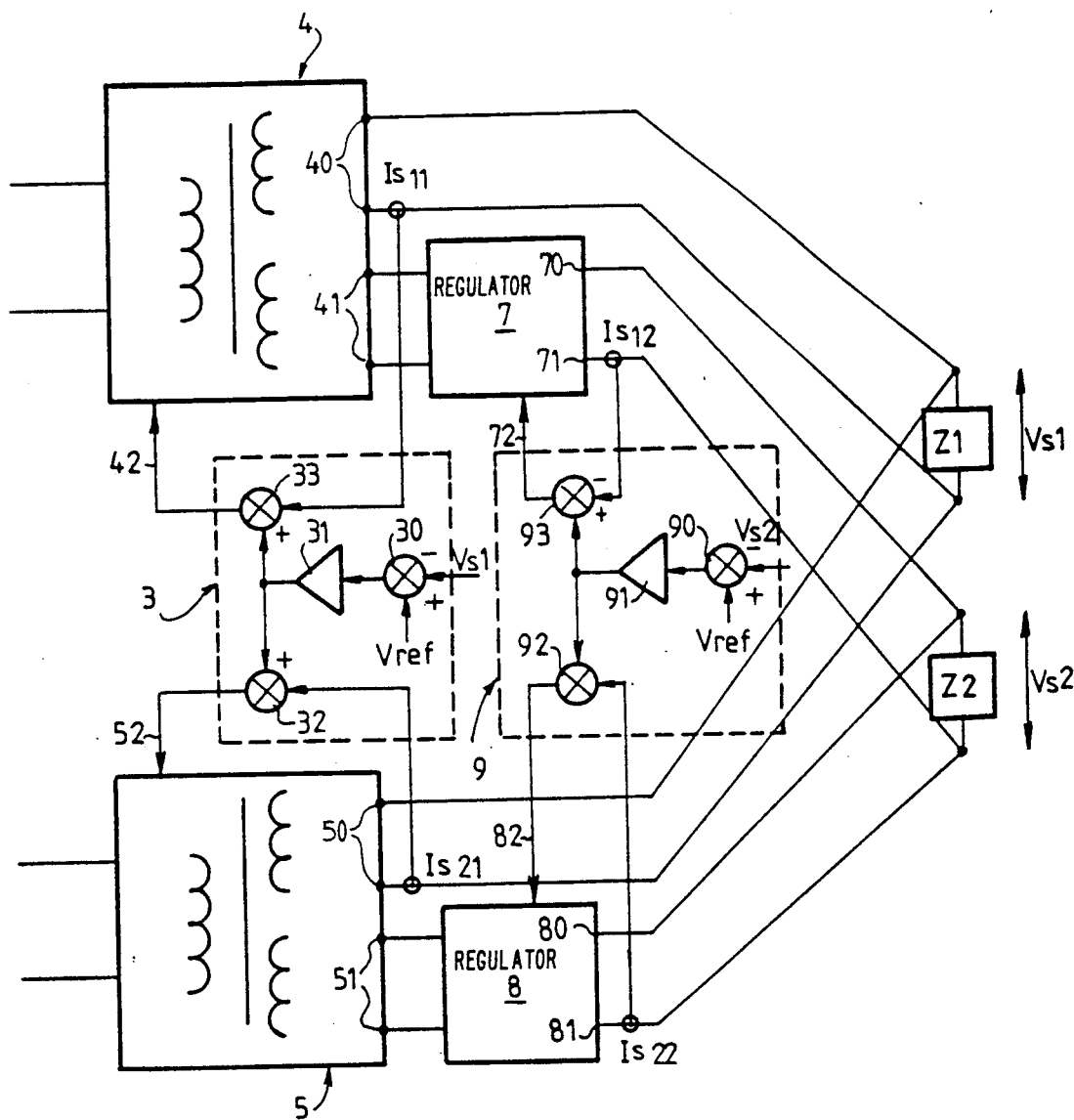
FIG. 1 shows a schematic of the converter according to the invention.

A first embodiment of the invention, shown in FIG. 1, provides the following solution to the problem of inequitable load sharing between at least two multiple-output converters. The circuit shown in FIG. 1 contains the regulating device (3) of the prior art for regulating first converter (4) and second converter (5). Circuit (3) is identical to that of FIG. 3 corresponding to the prior art, and is connected to converters (4) and (5) in a manner identical to the connection shown in FIG. 3. Thus, output (42) of subtractor (33) controls the cutoff circuit of converter (4) while output (52) of subtractor (32) controls the cutoff circuit of converter (5).

To solve the above problem, an output regulating device (postregulator) is connected to each additional output at the first output of each converter. Thus, second output (41) of first converter (4) is connected to an output regulator (postregulator) (7) whose outputs (70, 71) are connected to the two terminals of load ($Z_2$). Likewise, a second output (51) of a second converter (5) is connected to an output regulator (postregulator) (8) whose outputs (80, 81) are connected to the two terminals of load ($Z_2$).

Output (71) is connected in parallel with output (81). A signal ($Is_{12}$) proportional to the current delivered at output (71) and a signal ($Is_{22}$) proportional to the current delivered at output (81) are sent to the negative input of a first subtractor (93) and the negative input of a second subtractor (92), respectively. These two subtractors each receive, at their positive inputs, the output of an amplifier (91) delivering a voltage error signal. This voltage error signal is processed at the input of amplifier (91) by a subtraction circuit (90) which receives at its positive input a reference voltage and at its negative input the voltage at the terminals of load ($Z_2$).

The output regulating circuits (postregulators) (7) and (8) can be linear and in this case composed of an MOS ballast (or bipolar) transistor which absorbs the excess output voltage of secondary (41) or (51) and whose gate (base) is controlled by the respective command signal (72, 82).

In another embodiment, the output regulating circuit (postregulator) can be an electronic switch connected to the output of the secondary and controlled by a pulse width modulation circuit whose input receives the respective output signal (72, 82) from the regulating circuit, as is well known in the art.

The above description was prepared on the basis of two converters having two outputs, but obviously the principle of the invention may equally well apply to two converters having m outputs or to n converters having m outputs and connected in parallel. In this case, $n \times (m-1)$ output regulators (postregulators) will be used. Regulating circuits, such as 3, 6, and 9, may belong to any of the converters, or be distributed among them.

Figure 2:
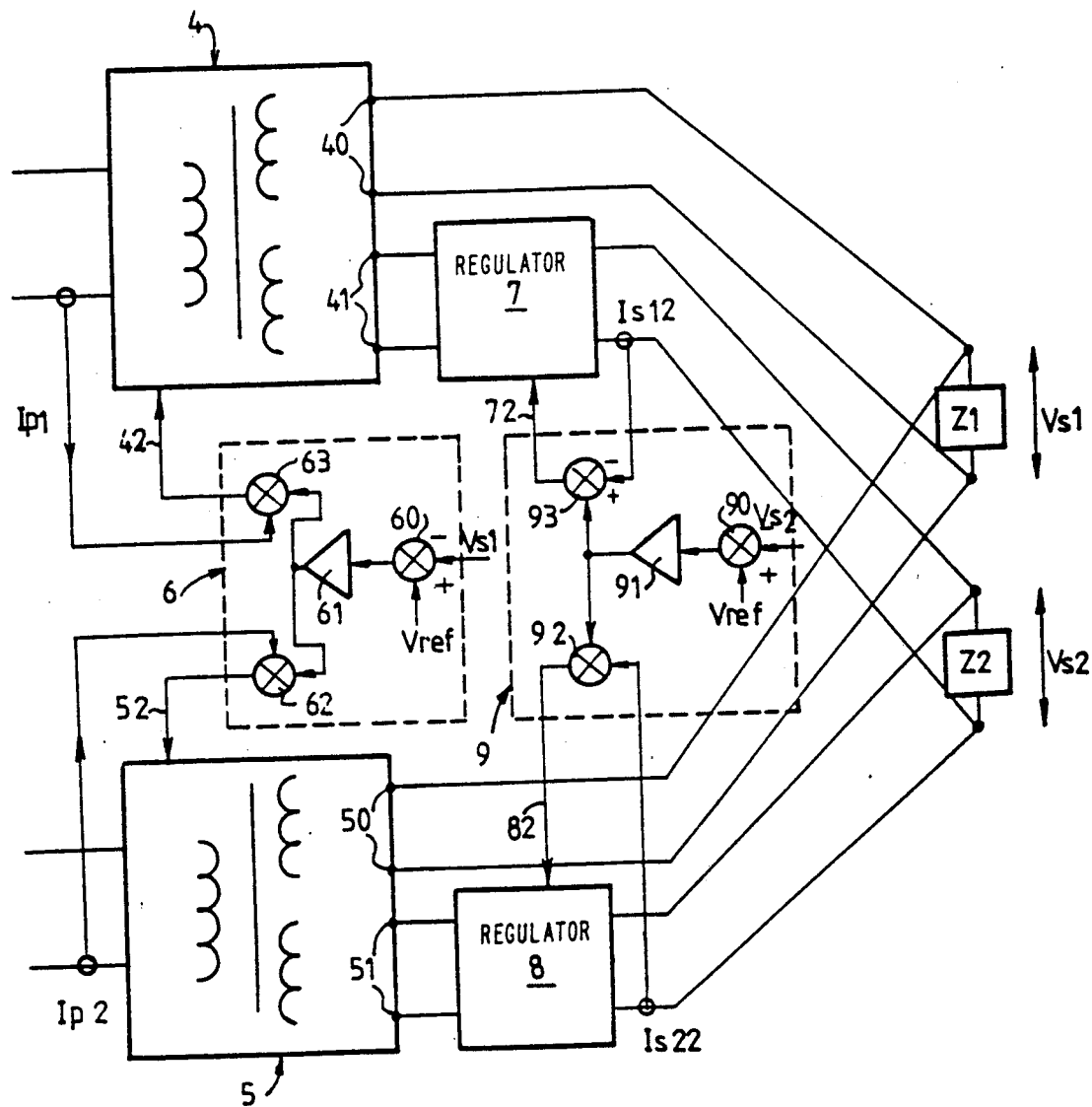
FIG. 2 shows a schematic of the second embodiment of the invention.

FIG. 2 shows a second embodiment of the invention wherein the first two current-regulating loops of the first output stage of each converter are not controlled as a function of the output currents of these stages, but as a function of the input currents ($Ip_1$) and ($Ip_2$) of the converters. Thus, in this case, the subtraction device (63) receives at its negative input, input current ($Ip_1$) from first converter (4) and at its positive input the output of an amplifier (61) whose input receives a signal representing the voltage error. This voltage error signal is processed by a subtraction circuit (60) receiving, at its positive input, the reference voltage and at its negative input, the voltage at the terminals of load ($Z_1$). Likewise, converter (5) is controlled by output (52) supplied by a subtraction circuit (62) whose negative input receives current ($Ip_2$) from converter input (5) and whose positive input receives the output of amplifier circuit (62). Such an arrangement simplifies the circuitry, in particular because of the insulation problem, etc.

Other modifications and implementations will occur to those skilled in the art without departing from the spirit and scope of the invention as claimed. Accordingly, the above description is not intended to limit the invention except as indicated in the following claims.

What is claimed is:

1. A power supply with multiple outputs comprising:
   at least two energy converters (4, 5) with multiple outputs including a first output (40) of a first converter (4) being connected in parallel with a first output (50) of at least one other converter (5) to provide current across a first load ($Z_1$);
   a first regulating circuit (3) for delivering to said converters (4, 5) a command signal which is a function of said current delivered to said first load ($Z_1$);
   for each output, other than said first output, of each of said energy converters, an output regulator (7, 8) connected between each output other than said first output and a load other than said first load ($Z_2$); and
   at least one other regulating circuit (9) for delivering to each output regulator (7, 8) a command which is a function of the current delivered by each converter output to a load other than said first load.

2. The power supply of claim 1 wherein said command signal delivered by said first regulating circuit (3) is a function of the input current ($I_{p1}$, $I_{p2}$) of each converter (4, 5).

3. The power supply of claim 1, wherein said command signal delivered by said first regulating circuit (3) is a function of the output currents ($Is_{12}$, $Is_{11}$, $Is_{21}$, $Is_{22}$) delivered to a load connected to the corresponding outputs of each converter.

4. The power supply of claim 1 wherein each regulating circuit includes:
   a subtraction circuit (90, 30) for subtracting the voltage ($V_{s1}$, $V_{s2}$) measured at the terminals of each load from a reference voltage ($V_{ref}$), thereby providing an error signal;
   an amplifier (31, 91) of said error signal to provide an output signal that is an amplified version of said error signal; and
   at least a second subtraction circuit (33, 93, 32, 92) for subtracting from said output signal of said amplifier, a signal that also provides current to one of said loads.

5. The power supply of claim 1, wherein each output regulator (7, 8) is an MOS ballast transistor which absorbs excess output voltage from a secondary (41, 51) of converter (4, 5), and whose grid is controlled by a command signal (72, 82) that is supplied by a regulating circuit other than said first regulating circuit and is a function of an output of said output regulator (7, 8).

6. The power supply of claim 1, wherein the output regulator (7, 8) is a bipolar transistor which absorbs excess output voltage from a secondary (41, 51) of converter (4, 5), and whose base is controlled by command signal (72, 82) supplied by a regulating circuit other than said first regulating circuit and is a function of an output of said output regulator (7, 8).

7. The power supply of claim 1, wherein the output regulator (7, 8) is an electronic switch connected at the output of a secondary of converter (4, 5), and is controlled by a pulse width modulation circuit whose input receives command signal (72, 82) supplied by a regulating circuit other than said first regulating circuit and is a function of an output of said output regulator (7, 8).

* * * * *